United States Patent Office
3,098,850
Patented July 23, 1963

3,098,850
3-ENAMINE DERIVATIVES OF 2α-METHYL-5α-ANDROSTANES
John C. Babcock, Portage Township, Kalamazoo County, J Allan Campbell, Kalamazoo Township, Kalamazoo County, and Raymond L. Pederson, Kalamazoo, Mich., assignors to The Upjohn Company, Kalamazoo, Mich., a corporation of Michigan
No Drawing. Filed Dec. 9, 1957, Ser. No. 701,347
3 Claims. (Cl. 260—239.5)

The present invention relates to novel steroid compounds and is more particularly concerned with 2α-methyl - 3 - oxygenated - 17 - oxygenated-5α-androstane compounds, to novel intermediates in the production thereof and to processes for the production of the novel compounds and novel intermediates.

The novel compounds of the present invention can be represented by the following formula:

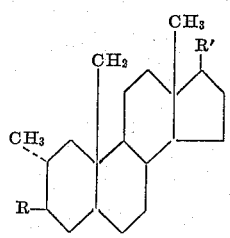

(I)

wherein R is selected from the group consisting of

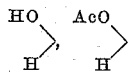

wherein Ac is the acyl radical of an organic carboxylic acid, preferably a hydrocarbon carboxylic acid containing from one to twelve carbon atoms, inclusive, and keto; and wherein R' is selected from the group consisting of

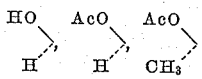

wherein Ac is as above defined,

and keto.

It is an object of the invention to provide the novel 2α-methyl - 3 - oxygenated - 17 - oxygenated-5α-androstane compounds, particularly the 2α-methyl-5α-androstane compounds represented by Formula I wherein R is a ketone or a free or esterified hydroxyl and wherein R' is a ketone or a hydroxyl or a hydroxyl and methyl group, the hydroxyls being either free or esterified. It is a further object of this invention to provide the novel intermediates and methods for the production of the novel compounds of this invention. Other objects of the present invention will be apparent to those skilled in the art to which this invention pertains.

The compounds of the present invention, compounds represented by Formula I, are valuable therapeutic agents. They exhibit anabolic-androgenic, progestational, and gonadotropin inhibiting properties. They are especially useful as anabolic-androgenic agents and are of particular advantage in cases where selective anabolic activity is required because of their favorable anabolic-androgenic ratio. For example, 2α,17α-dimethyl - 17β - hydroxy-5α-androstan-3-one was found to have an oral anabolic activity of over twice that of methyltestosterone and an androgenic activity of less than methyltestosterone. Likewise the anabolic activity of 2α-methyl-17β-hydroxy-5α-androstan-3-one was found to be about equal to that of testosterone propionate while the androgenic activity was about 25 percent that of testosterone propionate. The novel compounds of this invention, because of their anabolic activity, are useful in increasing weight, muscle strength, and for increasing the sense of well-being and positive nitrogen balance in pituitary deficiencies. A favorable anabolic response can be achieved without noticeable androgenic response owing to the high anabolic-androgenic ratio. They can be prepared and administered in a wide variety of oral or parenteral dosage forms singly, or in admixture with other coacting compounds. They can be associated with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups or elixirs.

The process of the instant invention comprises treating a 17-oxygenated-5α-androstan-3-one with a secondary cyclic alkylene amine to produce the 3-enamine of the corresponding starting material. The 3-enamine thus produced is then allowed to react with a methylating agent to produce the 2α-methyl-3-enamine compounds which on hydrolytic removal of the enamine blocking group yield the corresponding 2α-methyl-17-oxygenated-5α-androstan-3-one compounds. Reduction of these compounds with sodium borohydride produces the corresponding 3-hydroxy compounds which on acylation are productive of the 3-esters thereof. During the acylation step, a 17β-hydroxyl, when present, will also be acylated and thereby be productive of the corresponding 3,17-diacylates. Similarly, acylation of the 2α-methyl-3-keto compounds (before reduction with sodium borohydride) wherein a 17-hydroxyl is present, is productive of the corresponding 17-acylate.

Alternatively the compounds of the present invention can be produced by reduction of the 4-double bond of the corresponding 2α-methyl - 17 - oxygenated-4-androsten-3-one as more specifically illustrated by Examples 2 and 3. The saturated compounds thus produced can then be reduced with sodium borohydride to produce the corresponding 3-hydroxy compounds. Acylation of the hydroxy groups as described above is productive of the corresponding 3- and 17-acylates and the 3,17-diacylates.

The compounds of the present invention can be prepared from 17β-hydroxy - 5α - androstan-3-one, 17β-hydroxy - 17α - methyl-5α-androstan-3-one, and 5α-androstane-3,17,-dione, compounds well known in the art [see Fieser and Fieser, Natural Products Related to Phenanthrene, Reinhold Publishing Corp., New York (1949), page 375].

According to the process of the present invention, the ketone group at the 3-position of the above starting material is converted to the corresponding 3-enamine derivative by reaction with a secondary cyclic alkylene amine. The enamine formation can be carried out in accordance with the disclosure of U.S. Patent 2,781,342. Amines which can be used are cyclic amines such as pyrrolidine, piperidine, C-alkyl substituted piperidines, e.g., 2,4-dimethylpyrrolidine, 3-isopropylpyrrolidine, 3,3-dimethylpyrrolidine and the like. The preferred secondary amine is usually pyrrolidine. Although large molar equivalent excesses of the cyclic amine can be employed in the reaction, the preferred proportion of amine to starting steroid is usually from about 1.1 to about seven moles of amine per mole of steroid and especially from about 1.1 to two. Moisture in the reaction is detrimental to the procurement of high yields of product, and preferred reaction conditions therefore include removal of the water formed during the enamine formation by known methods. The reaction is preferably conducted above room temperature, i.e., above about 25 degrees centigrade, e.g., between about 25 and 150 degrees centigrade. Reaction times can vary between about a few minutes to several days, depending in part upon the reaction solvent or solvents, ratio of reactants, selected amine, water removal and temperature. Reaction solvents employed are organic solvents inert to the reaction such as benzene, toluene, xylene, chlorobenzene, pentane, hexane, methylene chloride, carbon tetrachloride, methanol, ethanol, tertiary butyl alcohol, tetrahydrofuran, dioxane, and the like.

The 3-enamine of the corresponding starting material thus produced is then methylated in a preferably dry inert organic polar solvent such as ethanol, methanol, isopropanol, butanol, dimethylformamide, and the like, with an excess of methylating agent such as a methyl halide to produce the 2α-methyl-3-enamine of the corresponding starting material. Methyl halides thus employed are those wherein the halogen is chlorine, bromine or iodine with bromine and iodine generally preferred. A preferred method is to treat the isolated and dried 3-enamine with an excess of methyl iodide in dry methanol and reflux until the reaction is complete. At the end of the reflux period, the excess methyl iodide is removed by distillation. The 3-enamine, preferably the 3-pyrrolidyl enamine, of 2α-methyl-17β-hydroxy-5α-androstran-3-one, 2α,17α-dimethyl-17β-hydroxy-5α-androstran-3-one, and 2α-methyl-5α-androstrane-3,17-dione thus produced can then be hydrolyzed with water, aqueous acid or base, alkanols or alkanol water mixtures. This treatment removes the 3-enamine group and results in regeneration of the Δ4-3-keto group in the steroid nucleus, with production of the 2α-methyl compounds of the corresponding starting material. A preferred method for the hydrolysis of the 3-enamine group is in a methanol and ten percent aqueous sodium hydroxide solution. The alkaline solution is heated under reflux for a few minutes and then concentrated by distillation to remove most of the methanol present and cause precipitation of the product. If the product is not solid the hydrolysis mixture is diluted with water and extracted with a water-immiscible solvent such as methylene chloride, benzene, toluene, hexane, or the like. The combined solvent extractions are then dried over a drying agent and the solvent removed by distillation giving the 2α-methyl compounds, i.e., 2α-methyl-17β-hydroxy-5α-androstan-3-one, 2α,17α-dimethyl-17β-hydroxy-5α-androstan-3-one, and 2α-methyl-5α-androstane-3,17-dione.

An alternate method for the preparation of the 2α-methyl-17-oxygenated-5α-androstan-3-one compounds of the present invention involves reduction of the 4-double bond of the appropriate 2-methylated starting materials such as, for example, 2α-methyltestosterone, 2α,17α-dimethyltestosterone, and the like, which are prepared from testosterone and 17α-methyltestosterone according to the procedures given by Ringold and Rosenkranz in J. Org. Chem., 21, 1333 (1956). The reduction can be accomplished either by hydrogenation with hydrogen in the presence of a catalyst such as palladium supported on charcoal, barium sulfate, zinc oxide, calcium carbonate, and the like, or by a metal such as, for example, lithium in liquid ammonia.

The hydrogenation is usually conducted in a solvent medium. Alkanols, hexane, acetone, methyl ethyl ketone, dioxane, acetic acid, ethyl acetate, or like organic solvents may be advantageously employed, with tertiary butyl alcohol being preferred. The catalyst can be reduced prior to the introduction of the 2-methyl-Δ4-steroid or preferably the steroid, catalyst and supporting media can be contacted together in a solvent medium prior to introduction of the hydrogen. It is not necessary to conduct the reaction under pressure, although, when pressure is utilized, a hydrogen pressure of about one to 100 pounds or more is operative, a pressure of from about ten to 25 pounds is preferred. Any suitable temperature between about zero and 100 degrees centigrade may be employed, with room temperature being satisfactory. Hydrogenation is continued until approximately one molar equivalent of hydrogen has been absorbed. The catalyst is then separated from the solution by filtration and the hydrogenated products separated by conventional separation or extraction procedures.

When reduction is accomplished with a metal such as, for example, lithium, sodium, potassium, and the like, with lithium being prefered, the reaction is conducted in liquid ammonia for a period of a few minutes to about four hours. A solvent such as, for example, ether, tetrahydrofuran, methylene chloride and the like may be employed if desired. On completion of the reaction, the ammonia is allowed to evaporate and the product is isolated by conventional procedures such as filtration or extraction with an organic solvent.

The thus-produced 2α-methyl-17-oxygenated-5α-androstan-3-one compounds are reduced at the 3-position with a chemical carbonyl reducing agent in an organic solvent, e.g., ethanol, methanol, isopropyl alcohol, and tetrahydrofuran, to produce the corresponding 3-hydroxy compounds, i.e., 2α-methyl-5α-androstane-3,17β-diol, 2α,17α-dimethyl-5α-androstane-3,17β-diol, and 2α-methyl-3-hydroxy-5α-androstan-17-one. Reducing agents such as an alkali metal borohydride or an alkali metal aluminum hydride, e.g., sodium borohydride, lithium aluminum hydride, lithium borohydride, and the like, are operative. The temperature of the reaction mixture is usually maintained between about zero and about 100 degrees centigrade with temperatures between about room temperature and the reflux temperature of the reaction mixture being preferred for a period varying from a few minutes to several hours. After the completion of the reaction, the reaction mixture is preferably mixed with water or an acid to decompose any excess reducing agent and organometal complexes. The product is isolated by known methods such as, for example, filtration or extraction with an organic solvent.

The compounds of this invention, represented by Formula I, may be utilized either as the free alcohols or as the esters. Acylation of the hydroxyl groups either at the 3- or 17-positions when such hydroxyl groups are present at those positions, is accomplished by allowing the hydroxy compounds to react with the anhydride of an organic carboxylic acid, preferably a hydrocarbon carboxylic acid containing from one to twelve carbon atoms, inclusive, for example, a saturated straight-chain aliphatic acid, e.g., acetic, propionic, butyric, valeric, hexanoic, lauric, a saturated branched-chain aliphatic acid, e.g., trimethylacetic, isobutyric, isovaleric, a cycloaliphatic saturated acid, e.g., cyclohexane-carboxylic acid, an alkaryl acid, e.g., phenylacetic, 2-phenylpropionic, o-, m-, and p-toluic, a saturated dibasic acid (which can be converted into water-soluble, e.g., sodium salts), e.g., succinic, adipic, a monobasic unsaturated acid, e.g., acrylic, crotonic, undecylenic, propiolic, cinnamic, a dibasic unsaturated acid (which can be converted into water-soluble, e.g., sodium salts), e.g., maleic and citraconic. Illustrative of the esters thus produced are the 3-monoacylates such as, for example, 2α-methyl-3-hydroxy-5α-androstan-17-one 3-acetate, 2α-methyl-3-hydroxy-5α-androstan-17-one 3-propionate, 2α-methyl-3-hydroxy-5α-androstan-17-one 3-hemisuccinate, 2α-methyl-3-hydroxy-5α-androstan-17-one 3-phenylacetate; the 17-monoacylates such as, for example, 2α-methyl-17β-hydroxy-5α-androstan-3-one 17-acetate, 2α-methyl-17β-hydroxy-5α-androstan-3-one 17-isovalerate, 2α-methyl-17β-hydroxy-5α-androstan-3-one 17-propionate, 2α-methyl-17β-hydroxy-5α-androstan-3-one 17-maleate; the 3,17-diacylates such as, for example, 2α,17α-dimethyl-5α-androstane-3,17β-diol 3,17-diacetate, 2α,17α-dimethyl-5α-androstane-3,17β-diol 3,17-dipropionate, 2α,17α-dimethyl-5α-androstane-3,17β-diol 3,17-dicrotonate, 2α,17a-dimethyl-5α-androstane-3,17β-diol 3,17-dipropiolate, and the like.

The following examples are illustrative of the process and products of the present invention, but are not to be construed as limiting.

*Example 1.—2α-Methyl-17β-Hydroxy-5α-Androstan-3-One*

A solution of four grams of 17β-hydroxy-5α-androstan-3-one in fifty milliliters of benzene was concentrated by heating to 35 milliliters in order to remove any water present. Two milliliters of pyrrolidine was then added and the solution was refluxed, under nitrogen for one and one-half hours, using a water trap to remove any water formed in the reaction. After the reflux period the reaction mixture was concentrated to dryness under reduced pressure to give 4.5 grams of the 3-pyrrolidyl enamine of 17β-hydroxy-5α-androstan-3-one as a crude white solid having a melting point of 201 to 206 degrees centigrade and a rotation of $[\alpha]_D$ plus 34 degrees (chloroform).

A suspension of 3.9 grams of the enamine in twenty milliliters of absolute methanol and five milliliters of methyl iodide (dried and freshly distilled) was refluxed under nitrogen for three hours. The solid went into solution after fifteen minutes of reflux. The reaction mixture containing the 3-pyrrolidyl enamine of 2α-methyl-17β-hydroxy-5α-androstan-3-one was then concentrated to near dryness and was diluted with twenty milliliters of ten percent sodium hydroxide solution and enough methanol to make a total volume of sixty milliliters. The resulting solution was heated under reflux for 25 minutes and was then concentrated until a solid precipitate formed. The solid was separated by filtration and was chromatographed over 100 grams of synthetic magnesium silicate. The column was eluted with 250 milliliter petroleum ether-acetone fractions as follows:

Fractions 1–3—two percent acetone in petroleum ether
Fractions 4–15—three percent acetone in petroleum ether
Fractions 16–17—four percent acetone in petroleum ether
Fractions 18–19—five percent acetone in petroleum ether Fractions 10 to 15, inclusive, were combined and evaporated to dryness to give 0.5 gram of 2α-methyl-17β-hydroxy-5α-androstan-3-one which on recrystallization from ether-Skellysolve B hexanes gave needle-like crystals which melted at 151 to 153 degrees centigrade and had a rotation of $[\alpha]_D$ plus 29 degrees (chloroform).

*Analysis.*—Calculated for $C_{20}H_{32}O_2$: C, 78.88; H, 10.59. Found: C, 78.93; H, 10.14.

Fractions 8 and 9 were combined and recrystallized from ether-Skellysolve B hexanes to give dense prism-like crystals which melted at 174 to 176 degrees centigrade. Infrared analysis showed this material to be a different crystalline form of 2α-methyl-17β-hydroxy-5α-androstan-3-one.

Following the procedure above but substituting 5α-androstane-3,17,dione or 17β-hydroxy-17α-methyl-5α-androstan-3-one as starting material therein is productive of 2α-methyl-5α-androstane-3,17-dione and 2α,17α-dimethyl - 17β - hydroxy - 5α - androstan - 3 - one, respectively. The intermediate 3-pyrrolidyl enamine of 2α-methyl-5α-androstane-3,17-dione and 3-pyrrolidyl enamine of 2α,17α-dimethyl-17β-hydroxy-5α-androstan-3-one are produced by the reaction.

*Example 2.—2α-Methyl-17β-Hydroxy-5α-Androstan-3-One*

A mixture containing 0.91 gram of 2α-methyltestosterone, forty milliliters of t-butyl alcohol and ninety milligrams of five percent palladium on charcoal catalyst was hydrogenated with hydrogen at atmospheric pressure. After 32 minutes when the theoretical amount of hydrogen was taken up, the hydrogenation was stopped and the catalyst was removed by filtration. The filtrate was concentrated to dryness and the residue was chromatographed over 110 grams of synthetic magnesium silicate. The column was eluated with ninety milliliter fractions of three percent acetone in Skellysolve B hexanes. Fractions 26 to 36, inclusive, were combined and recrystallized from acetone to give 129 milligrams of 2α-methyl-17β-hydroxy-5α-androstan-3-one identical to that obtained by the procedure of Example 1.

*Example 3.—2α,17α-Dimethyl-17β-Hydroxy-5α-Androstan-3-One*

To 250 milliliters of liquid ammonia, which had been dried with traces of lithium until a blue color remained, was added 400 milligrams of lithium followed by a solution of 2α,17α-dimethyltestosterone in 48 milliliters of anhydrous ether and four milliliters of tetrahydrofuran. Addition of the 2α,17α-dimethyltestosterone solution was done dropwise over a period of thirty minutes. After stirring for an additional twenty minutes the mixture was acidified with the addition of five grams of solid ammonium chloride and the ammonia was allowed to evaporate off. The residue was diluted with water and extracted with ether. The ether extract was washed with water, dried, and evaporated to dryness to give 1.13 grams of solid 2α,17α-dimethyl-17β-hydroxy-5α-androstan - 3 - one identical to that obtained by the procedure of Example 1. An analytical sample melted at 134 to 136 degrees centigrade and had a rotation of $[\alpha]_D$ plus one (chloroform).

*Analysis.*—Calculated for $C_{21}H_{34}O_2$: C, 79.19; H. 10.76. Found: C, 78.63; H, 10.58.

*Example 4.—2α,17α-Dimethyl-5α-Androstane-3,17β-Diol*

A solution containing 1.66 grams of sodium borohydride in seventeen milliliters of 0.1 N sodium hydroxide was added to a solution of 3.2 grams of 2α,17α-dimethyl-17β-hydroxy-5α-androstan-3-one in 85 milliliters of ethanol. After twenty minutes of stirring, the mixture was diluted with 250 milliliters of water and was acidified to pH 6 by dropwise addition of thirty percent acetic acid. The resulting solid precipitate was collected by filtration, washed, and dried to give three grams of 2α,17α-dimethyl-5α-androstrane-3,17-diol. Two recrystallizations from acetone gave 0.70 gram of purified product having a melting point of 176 to 178 degrees centigrade and a rotation of $[\alpha]_D$ minus 24 degrees (pyridine).

*Analysis.*—Calculated for $C_{21}H_{36}O_2$: C, 78.69; H, 11.32. Found: C, 78.48; H, 11.48.

Following the procedure above but substituting 2α-methyl-17β-hydroxy-5α-androstan-3-one of Examples 1 and 2 as starting material therein is productive of 2α-methyl-5α-androstane-3,17β-diol.

*Example 5.—2α-Methyl-3-Hydroxy-5α-Androstan-17-One*

Following the procedure of Example 4, reduction of 2α-methyl-5α-androstane-3,17-dione of Example 1 with one equivalent of sodium borohydride gave a reduction mixture which was chromatographed over synthetic magnesium silicate using Skellysolve B hexanes plus acetone for elution of the column. The fraction which by infrared analysis showed the absence of a six membered ring ketone was recrystallized from acetone to give a 2α-methyl-3-hydroxy-5α-androstan-17-one.

*Example 6.—2α,17α-Dimethyl-5α-Androstane-3,17β-Diol 3,17-Diacetate*

One gram of 2α,17α-dimethyl-5α-androstane-3,17β-diol was dissolved in 22 milliliters of acetic anhydride and the solution was heated under reflux for one-half hour. The excess acetic anhydride was then removed by distillation under reduced pressure and the resulting residue was crystallized from methanol to give 2α,17α-dimethyl-5α-androstane-3,17β-diol 3,17-diacetate.

Similarly, by allowing 2α,17α-dimethyl-5α-androstane-3,17β-diol to react with the appropriate hydrocarbon carboxylic acid anhydride, for example, at temperatures between 100 and 150 degrees centigrade, there are produced other 3,17-diacylates such as, for example, 2α,17α-dimethyl-5α-androstane-3,17β-diol 3,17-dipropionate,
2α,17α-dimethyl-5α-androstane-3,17β-diol 3,17-dibutyrate,
2α,17α-dimethyl-5α-androstane-3,17β-diol 3,17-divalerate,
2α,17α-dimethyl-5α-androstane-3,17β-diol 3,17-dihexanoate,
2α,17α-dimethyl-5α-androstane-3,17β-diol 3,17-dilaurate,
2α,17α-dimethyl-5α-androstane-3,17β-diol 3,17-di-(trimethylacetate),
2α,17α-dimethyl-5α-androstane-3,17β-diol 3,17-diisobutyrate,
2α,17α-dimethyl-5α-androstane-3,17β-diol 3,17-diisovalerate,
2α,17α-dimethyl-5α-androstane-3,17β-diol 3,17-dicyclohexane carboxylate,
2α,17α-dimethyl-5α-androstane-3,17β-diol 3,17-dibenzoate,
2α,17α-dimethyl-5α-androstane-3,17β-diol 3,17-diphenylacetate,
2α,17α-dimethyl-5α-androstane-3,17β-diol 3,17-di-(β-phenyl)-propionate,
2α,17α-dimethyl-5α-androstane-3,17β-diol 3,17-di-(o-, m-, p-toluate),
2α,17α-dimethyl-5α-androstane-3,17β-diol, 3,17-dihemisuccinate,
2α,17α-dimethyl-5α-androstane-3,17β-diol 3,17-dihemiadipate,
2α,17α-dimethyl-5α-androstane-3,17β-diol 3,17-diacrylate,
2α,17α-dimethyl-5α-androstane-3,17β-diol 3,17-dicrotonate,
2α,17α-dimethyl-5α-androstane-3,17β-diol 3,17-diundecylenate,
2α,17α-dimethyl-5α-androstane-3,17β-diol 3,17-dipropiolate,
2α,17α-dimethyl-5α-androstane-3,17β-diol 3,17-dicinnamate,
2α,17α-dimethyl-5α-androstane-3,17β-diol 3,17-dimaleate,
and 2α,17α-dimethyl-5α-androstane-3,17β-diol 3,17-dicitraconate.

Similarly, acylation of 2α-methyl-5α-androstane-3,17-diol, 2α-methyl-17β-hydroxy-5α-androstan-3-one, 2α,17α-dimethyl-17β-hydroxy-5α-androstan-3-one, and 2α-methyl-3-hydroxy-5α-androstan-17-one with the appropriate hydrocarbon carboxylic acid anhydride is productive of the corresponding 3,17-diacylates, 17-acylates, and 3-acylates, respectively. The preferred acylates are those corresponding to the acylates described above for 2α,17α-dimethyl-5α-androstane-3,17β-diol.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. The 3-pyrrolidyl enamine of 2α-methyl-17β-hydroxy-5α-androstan-3-one.
2. The 3-pyrrolidyl enamine of 2α,17α-dimethyl-17β-hydroxy-5α-androstan-3-one.
3. The 3-pyrrolidyl enamine of 2α-methyl-5α-androstane-3,17-dione.

References Cited in the file of this patent

Conf. on Metabolic Aspects of Convalescence, Trans. vol. 13, page 111 (1946), by Woodley et al., C.A., vol. 43, page 7124(g).

Fieser: Natural Products Related to Phenanthrene, pages 423, 424, and 427 (1949).